US010670460B1

(12) United States Patent
Waterbury

(10) Patent No.: US 10,670,460 B1
(45) Date of Patent: Jun. 2, 2020

(54) MULTI-STATIC RAMAN LIDAR

(71) Applicant: Alakai Defense Systems, Inc., Largo, FL (US)

(72) Inventor: Robert Douglas Waterbury, Palm Harbor, FL (US)

(73) Assignee: Alakai Defense Systems, Inc., Largo, FL (US)

(*) Notice: Subject to any disclaimer, the term of this patent is extended or adjusted under 35 U.S.C. 154(b) by 0 days.

(21) Appl. No.: 16/160,636

(22) Filed: Oct. 15, 2018

Related U.S. Application Data

(60) Provisional application No. 62/572,851, filed on Oct. 16, 2017.

(51) Int. Cl.
*G01J 3/44* (2006.01)
*G01J 3/02* (2006.01)
*G01N 21/64* (2006.01)

(52) U.S. Cl.
CPC . *G01J 3/44* (2013.01); *G01J 3/02* (2013.01); *G01N 21/64* (2013.01)

(58) Field of Classification Search
CPC .... G01N 21/65; G01N 21/474; G01N 33/227; G01N 21/227; G01N 2021/1793; G01N 2201/06113; G01N 2021/655; G01J 3/0272; G01J 3/44; G01J 3/0237; G01J 3/443; G01J 2003/4424; G01J 3/28; G01J 3/26
See application file for complete search history.

(56) References Cited

U.S. PATENT DOCUMENTS

| | | | |
|---|---|---|---|
| 8,125,627 B2 | 2/2012 | Dottery et al. | |
| 2007/0222981 A1* | 9/2007 | Ponsardin | G01J 3/02 356/301 |
| 2013/0293882 A1 | 11/2013 | Dottery et al. | |
| 2014/0032021 A1 | 1/2014 | Metzler et al. | |
| 2015/0236778 A1 | 8/2015 | Jalali | |

* cited by examiner

*Primary Examiner* — Abdullahi Nur
(74) *Attorney, Agent, or Firm* — McKee, Voorhees & Sease, PLC

(57) ABSTRACT

The present invention relates to a highly flexible stand-off distance chemical detector system such as can be used, for example, for standoff detection of explosives. Instead of a combined laser interrogation source and optical content detector on the same platform, those features are carried on separate platforms, including having plural optical content detectors on individual platforms. In one embodiment, the detector platforms are mobile remote-control apparatus. This allows collection and evaluation of optical content/information from multiple collection positions/directions and high flexibility in maneuverability of the collection function relative the target.

20 Claims, 3 Drawing Sheets

MULTI-STATIC RAMAN LIDAR

CROSS-REFERENCE TO RELATED APPLICATIONS

This application claims the benefit of Provisional Application U.S. Ser. No. 62/572,851, filed on Oct. 16, 2017, all of which is herein incorporated by reference in its entirety.

I. BACKGROUND OF THE INVENTION

A. Field of the Invention

The present invention relates to methods and systems for detection of chemical compounds from stand-off distances and, in particular, to methods and systems utilizing multi-static Raman spectroscopy or other reflectance or optical content evaluation in a highly portable configuration.

B. Problems in the State of the Art

1. Background

Typical Raman and LIDAR systems have a monostatic single transmitter (laser) and receiver (detector or spectrometer). See U.S. Pat. No. 8,125,627 (illustrates one example of and background information about optical sensing with Raman spectroscopy) and US US20130293882A1 (illustrates one example of and background information about optical sensing with Raman LIDAR spectroscopy), both owned by Alakai Defense Systems, Inc. and incorporated by reference herein respectively. The transmitter and detector are usually positioned together, such as on the same vehicle.

2. Problem Statement

However, using a single transmitter/receiver paradigm presents certain issues. Some include:
 a. There are limitations on the amount of relevant information that can be collected from the target.
 b. There are limitations as to how best to position a detector relative to a sometimes dangerous or hostile target.

Systems and techniques of this type present a number of competing interests and factors. For example:
 a. Maneuverability of the transmitter/receiver for best information from and position relative to the target, including safety of human and other assets.
 b. Cost.
 c. Complexity.

Therefore, there is room for improvement relative to the existing paradigm in this technical state of the art.

II. SUMMARY OF THE INVENTION

A. Objects, Features, and Advantages of the Solution of the Invention

A principal object of the present invention is to provide apparatus, systems, and methods for solving problems or overcoming deficiencies in the state-of-the-art regarding optical detectors.

As will be seen by reference to the following disclosure, the solutions of the present invention provide one or more of the following benefits:
 a. Potential for more relevant/useful information about the target.
 b. Balance of cost, complexity, and maneuverability for collection of relevant information.
 c. Flexibility/adaptability regarding positioning of one or more detector relative to target.

Additional aspects, advantages, options, and features meaningful to standoff distance Raman/LIDAR detection (or other reflectance components), including explosives, are disclosed herein and will become more apparent with reference to the accompanying description and drawings.

B. Aspects of the Solution of the Invention

Figure 1A:
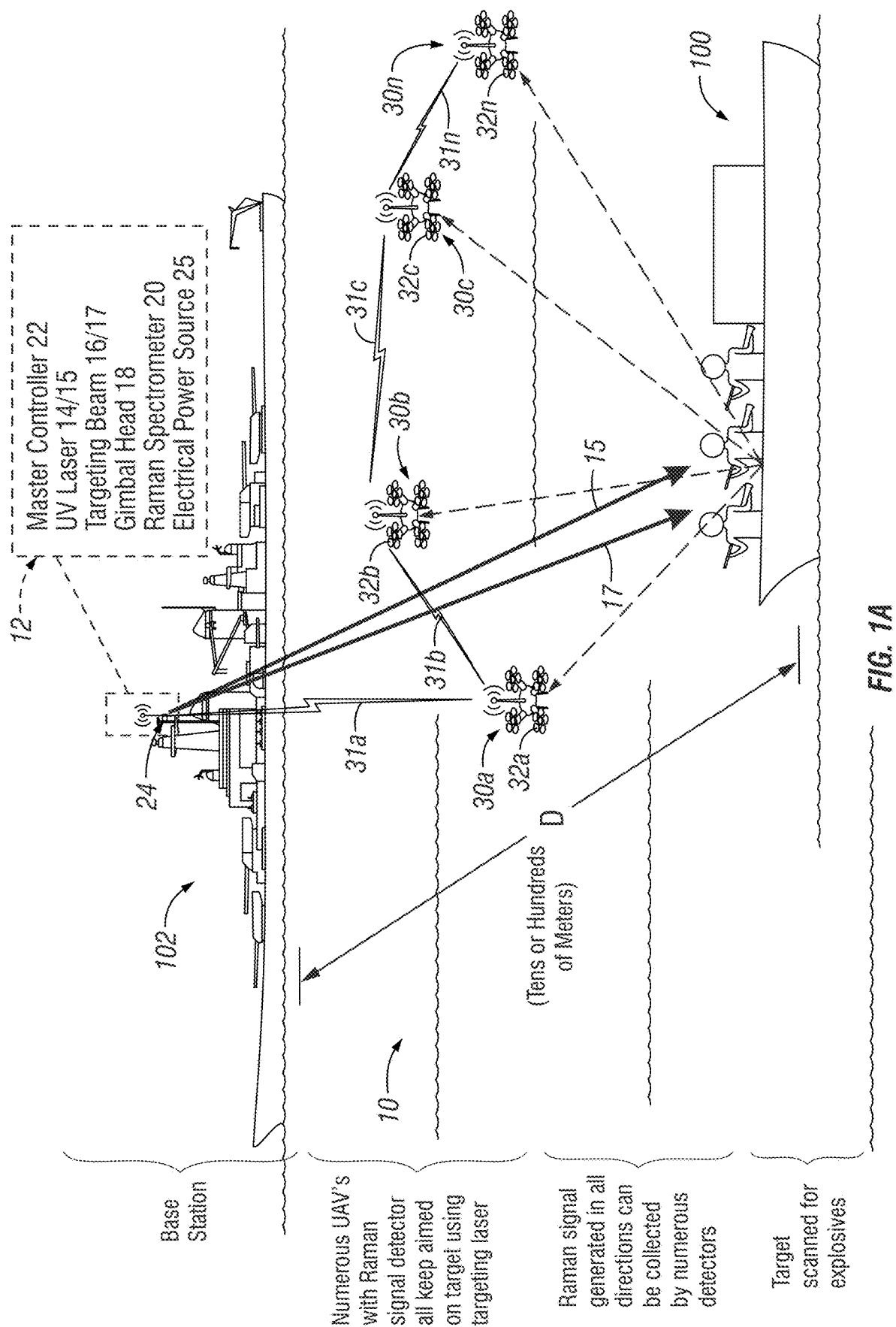
Figure 1B:
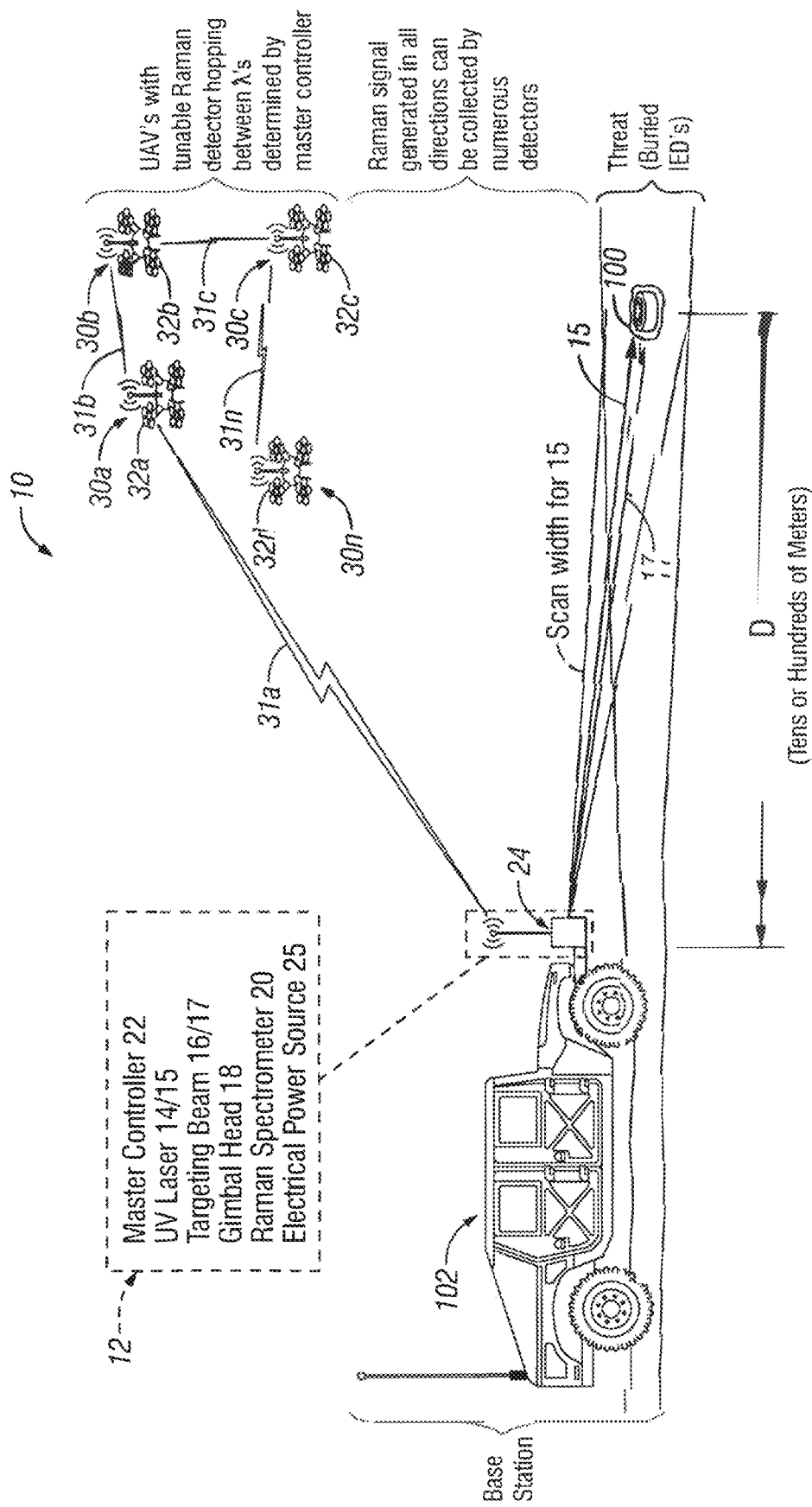

This concept has a single transmitter but utilizes multiple detectors all pointed essentially at the same point in space as the transmitter to, inter alia, collect additional data/information from these different positions and viewing directions (see, for example, FIG. 1A and FIG. 1B). Another advantage of this is that if the detectors are carried on controllable mobile platforms (e.g. placed on small Unmanned Aerial Vehicles (UAV's)), then they can get closer to the desired target and get faster detections, at farther distances from the base sub-system, or detections of lower concentrations as compared to a classic co-located transmitter/receiver optical system.

The foregoing is possible because Raman signal (and at least some other types of scattering) is basically generated in all directions and, thus, can be collected by numerous detectors including at different positions relative the target. Radiation in multiple directions is also the case with, e.g., excited fluorescence by the interrogating laser, diffuse reflection spectroscopy, and other stand-off chemical detection techniques such as are known to those skilled in the art.

A typical multi-static radar system, for example, has multiple spatially diverse monostatic radar or bistate radar components with a shared area of coverage to allow different aspects of a target to be viewed simultaneously. Here, the system according to the invention is multistatic at least in the sense that it uses multiple spatially diverse monostatic optical detectors with a shared excitation source and area of coverage. This can allow the same information from the different spatial positions. It can also allow different information from the different detectors. It also contemplates communicating the information obtained by the plural detectors to a component that can evaluate this different information and, if desired, somehow merge or manage it in advantageous ways for a given application. The shared excitation source and diverse optical detectors can be fixed relative to one another. The diverse optical detectors would be aimable or steerable so they are always looking at the correct spot or location at the target. Alternatively, the shared excitation source could be mobile relative to fixed diverse optical detectors, the shared excitation source could be fixed relative to some or all of the diverse optical detectors being mobile, or both the fixed excitation source and the diverse optical detectors could be mobile.

A first aspect of the invention relates to a system for chemical detection at standoff distances in a variety of environments. The system includes a base sub-system where an electromagnetic source such as an interrogation laser or other controlled electromagnetic energy source can be scanned over an area or object of interest and/or directed onto a target. The base subsystem can be carried on a mobile platform such as a land or water vehicle, but does not necessarily have to be mobile. The system also includes multiple detector sub-systems configured to collect and process reflectance or excited electromagnetic energy from the laser-or other energy source-interrogated target for content (e.g. Raman, fluorescence, reflectance, etc.). Each different processed evaluation can be communicated to a central processor/controller. Ability to gather enhanced information from multiple viewing positions and evaluate that information individually, collectively, or in some combination, can improve outcomes. The detector sub-systems can be mobile and/or remote controlled but do no necessarily have to be, so long as at least some are spatially diverse from the target.

A second aspect of the invention relates to carrying each of a set of detector sub-systems on its own controllable mobile platform. This can allow a variety of benefits. One is opportunity to manipulate one or more detectors to closer proximity to the target than if with the base sub-system. This can be by remote control (e.g. wireless) or semi-automatically (e.g. each detector subsystem senses and follow a locator cure such as a targeting beam or via other geospatial information. Another is opportunity to get different viewing directions and positions relative a target to increase the potential of good reflectance or other optical information processing. Another is just the flexibility of moving one or more detectors closer or farther. In one example, the controllable movable platform is an UAV. One possible UAV is a drone (e.g. air, land, or water, or combinations of the foregoing). This can reduce risk to assets (humans, more expensive hardware such as vehicles, etc.). Utilization of wireless communication can allow both control signals to each of the detector sub-systems as well as gathering of relevant reflectance or other optical information (Raman, fluorescence, etc.) for evaluation individually or collectively.

Another aspect of the invention relates to methods for carrying out stand-off distance chemical detection by illuminating a target with a pre-defined excitation source but collecting and processing reflectance or other optical information from the target at plural different positions relative the target. As will be appreciated, the collected and processed reflectance or other optical information can be communicated to a central location where it can individually or collectively be evaluated. For example, one of the processed reflectance or other optical information could be selected from the plural collected ones as either representative or of assumed more accurate results.

In one implementation of the method, controllable mobile platforms are used to create the ability to collect the reflectance or other optical information at plural positions relative the target. One example of such platforms are UAVs.

A subtlety of aspects of the invention is to take advantage of advances in UAV technology (e.g. quad copters, etc.) and use the same to make mobile, highly maneuverable carrier platforms to split out detector subsystems from a main central subsystem. Benefits can come from the interaction of making the system multi-static in at least the following ways:
 a. It is not just making the system multi-static. It increases flexibility, adaptability, and efficacy of standoff reflectance-based or other optical information based detection, which can be especially important in sometimes life and death situations involved with IEDs or military situations.
 b. A set of multiple detectors on controllable platforms (e.g. UAVs) may detect a chemical or material of interest even a second or less in time that could allow compensatory action by such things as having multiple detectors (e.g. one might get a good signal ahead of, for example a fraction of second ahead of, others or have line-of-sight with the base sub-system so that wireless communication is quicker, for example even a fraction of second), having multiple viewing directions (e.g. one direction or angle might give quicker, better, more accurate information than others), and multiple distances from target (e.g. one might be better than others). Another subtlety, especially in critical detection situations, is to have more than one detector so that if one or more others is taken out by an enemy or adverse party or malfunctions, or cannot get good detection information, one or more of the others can.

The invention is counter-intuitive at least in adding cost and complexity with plural detectors and the infrastructure to control them, but with advantages, some subtle, that such enables.

III. BRIEF DESCRIPTION OF THE DRAWINGS

FIGS. 1A and B are conceptual diagrams of a multistatic UV Raman system according to exemplary embodiments of the present invention. They can be utilized to protect ships, vehicles, entry control points, or other assets. FIG. 1A is applied to ships; FIG. 1B to land vehicles.

Figure 2:
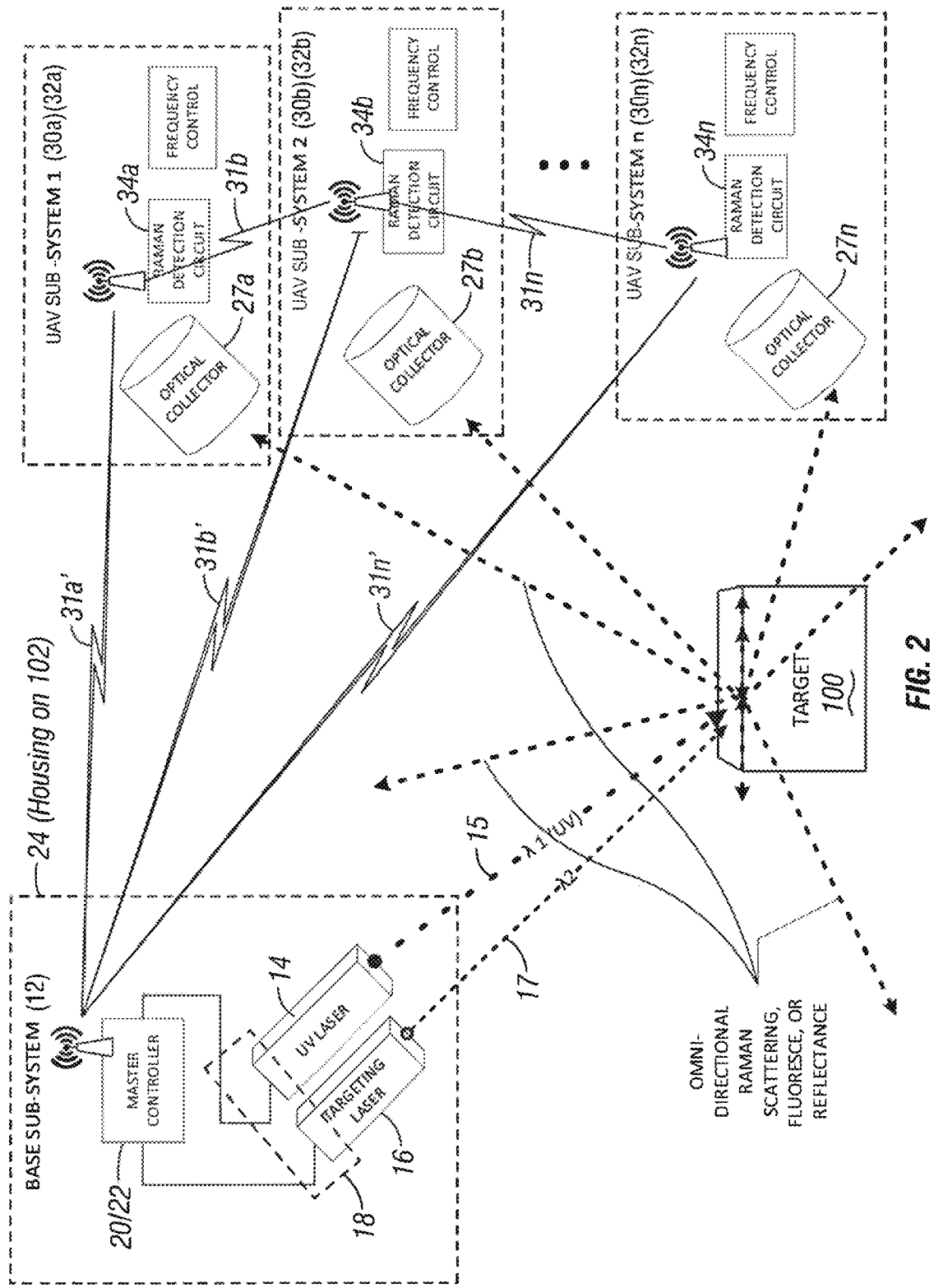

FIG. 2 is a diagrammatic depiction of one example of electromagnetic energy types, wireless communication channels, and other components to effectuate the concepts of FIGS. 1A and B.

IV. DETAILED DESCRIPTION OF EXEMPLARY EMBODIMENTS OF THE INVENTION

A. Overview

For a better understanding of the invention, some examples of forms it can take all now be described in detail. It is to be understood these are neither exclusive nor inclusive of all such forms or embodiments the invention can take.

First, several embodiments and options useable with a Raman or LIDOR sensor for chemical detection at standoff distances will be described. Variations obvious to the skill you will be included within these embodiments. For example, optically collected information from a target can be processed and evaluated by any or all of the mobile detector subsystems. The optical information can be, e.g., Raman content. It can be other components of reflectance or other optical information or content in the field of view of the light collection optics. A few non-limiting examples are given below. The invention is not necessarily limited to those examples.

Second, an expansion of those concepts to optional features or alternatives will be described. It will be understood by those skilled in the art that these are examples only for illustration and variations obvious to those skilled in the art of course possible.

It will also be understood that the examples focus, just for purposes of simplicity, on detection of explosives such as used with IEDs (improvised explosive devices). The concept of the invention can be applied to a wide variety of chemicals, chemical compounds, and chemical constituents, as is well known in Raman- or LIDOR-based spectroscopy. Form factor and characteristics of the components, as well as the parameters to control them, will, of course, also vary according to need or desire.

B. System Elements

In this exemplary embodiment, system 10 consists of two main sub-systems which are:
 1. Base sub-system 12 with Master Controller/Transmitter. This particular sub-system 12 uses a main Deep UV Raman laser 14 (with resulting interrogation laser beam 15), a targeting laser 16 (with resulting targeting laser beam 17), a beam-directing gimbal head 18 to steer laser beam 15 (and optionally laser beam 17 also) onto a target 100, a Raman spectrometer 20 for full spectra analysis, and a main processing unit 22. This sub-system 12 initially would be deployed on a platform 24 that has a sufficient electrical power source 25 for the laser(s) and any other electrical or electronic components, as well as supporting components, and is typically on, at, or near an asset 102 that needs protection (i.e. ship, truck, entry control point, etc.). Non-limiting examples of supporting components can include cameras for visual identification and record keeping, GPSs for object location, radios for communications of information and results, etc. The base subsystem 12, or at least much of it, can be incorporated into a housing that can be mounted in appropriate position, with sufficient and desired clear field-of-view for the laser beams 15 and 17 to project therefrom to targets.

2. Plural detector sub-systems 30*a-n*. Multiple UAV's 32*a-n* are each outfitted with a small, low-cost, tunable UV Raman detector 34*a, b, c, . . .*, or n (see FIG. 2) respectively, which would be dynamically programmed to specific Raman wavelengths by the master controller 22. Utilizing the targeting beam 17, each of the corresponding UAV's 32*a-n* would fly in a coordinated pattern at a specific altitude above a target 100 and keep the detectors 34*a-n* locked onto the targeting beam 17. In real time the signals 31*a-n* from each of the Raman detectors 34*a-n* would be communicated back to the master controller 22 and processed for chemical detection of chemical(s) of interest at the target 100 (one non-limiting example being LEDs). This could be by daisy-chain communications 31*a*-31*n* but could be direct from each subsystem 30 to base subsystem 12 (see 31*a'*-31*n'*). As indicated in the Figures, each detector sub-system 30 would therefore have the ability to automatically both position its individually mobile-controllable platform 32 in a pre-determined but different position relative to target 100 as well as each automatically operate its on-board optical components to collect relevant optical information from target 100. Optical collection can be any of a variety of ways including telescopes and digital imagers (indicated generally at ref no. 27*a-n* in FIG. 2. Non-limiting examples are at U.S. Pat. No. 8,125,627 and US 2013/0293882 A1 cited above. As indicated, this operation could involve each mobile detector sub-system 30 to collect the same optical type of information from the target (e.g. the same optical wavelength(s)) or at least some collect different types of optical information from the same target 100. This enables the advantage of either processing and evaluating the same type of optical information from different collection points and directions or, if desired, processing and evaluating different types of optical information from those difference collection points and directions. Of course, it also allows, if desired, some sub-systems 30 processing and evaluating the same type of optical information and others different types.

The ability to instruct each mobile detector sub-system 30 to a certain position relative a target 100, maintain such position during optical information gathering, as well as which type of optical information is gathered, can be coordinated by base sub-system 12 via programming and control via, for example, a programmable digital controller with wireless communication with all of the mobile detector sub-systems 30. As indicated in FIG. 2, one way is with a targeting laser 16 to which each mobile detection sub-system 30 can lock on by techniques well-known by those skilled in this technical art. One way is to carry on-board each mobile detection sub-system 30 a frequency control that can be instructed by base sub-system 12 as to which spectral content should be processed or evaluated by each sub-system 30. This is also known by those skilled in this art. And coordination of plural mobile platforms by wireless control is known.

Additional Details

Additional understanding of ways in which this embodiment can be made and used, are set forth below:

1. The detectors 34*a-n* could be fixed or mobile. If mobile they could be on UAVs 32*a-n* or other types of robots (ground vehicles).
2. Each detector 34*a-n* could be either:
    a. A detector at a fixed wavelength.
    b. A detector with a programmable filter in front of it selecting the wavelength. The programmable information could be determined from:
        i. The results obtained by that specific detector.
        ii. The master controller can obtain the results from all detectors in real time and then communicate a new set of desired wavelengths to each detector.
    c. A spectrometer which detects multiple wavelengths.
3. The information from each detector:
    a. Could be processed locally and detections based on that information solely.
    b. Communicated back to the master controller and then all of the information can be utilized in an algorithm to obtain the detection results.
4. Depending on the wavelength of the Raman laser 15, there may need to be an additional co-boresighted targeting beam. The additional beam could be for eye-safety purposes (using, e.g., Alakai's patented stimulated aversion technique at U.S. Pat. No. 8,724,097 to Pohl, Ford, Waterbury, Vunck and Dottery incorporated by reference herein), or it may be a different wavelength which is easier for the detectors to see so that the detectors can be aimed at the correct spot. Therefore 1 or 2 beams could be used here.
5. The main laser beam 15 or targeting beam 17 could be modulated to:
    a. More easily allow the detectors to each find it and lock onto it.
    b. To encode information or timing synchronization features that needs to be communicated to the detectors.
6. The system could be utilized to perform at least the following non-limiting types of measurements:
    a. Raman detection.
    b. Fluorescence detection.
    c. Fluorescence lifetime detection.
    d. Reflectance detection.

C. System Operation

Several applications using system 10 are described above. As can be appreciated, with use of the multistatic spatially diverse detectors on UAVs, a master controller can coordinate movement and positioning of the UAVs and collection of information/data related to optical detections at each UAV. The controller can utilize any number of programming regimes to process the collected multistatic information/data.

In the example of FIG. 1A, to assist in positioning and maintaining the UAVs in spatially diverse but relevant positions for obtaining useful detection information, a targeting beam 17 can be used. An example of such a beam and how drones or UAVs lock on to maintain target position in a different context can be found at US 20140032021A1 (illustrates one example of and background information about using a targeting laser with UAVs to coordinate their movement), which is incorporated by reference herein. Such a targeting beam could be applied in analogous ways to the present embodiment of the invention.

In the examples of the Figures, communication between the base sub-system and the UAVs/detectors is wireless. This allows both remote control by the base sub-system of UAV functions but also optical detector/spectrometer functions. An example of a wireless communication system for a set of drones/UAVs can be found at US 201500236778 A1 (illustrates one example of and background information about a wireless communication system for secure communication between multiple drones/UAVs to coordinate communication of information/data from each and communication between each), which is incorporated by reference herein. Such concepts can be applied in analogous ways to the embodiments of the present invention.

One possible feature that can be used with these embodiments is indicated at FIG. 1B. Each detector sub-system could have a frequency control that could inform its optical detector/evaluator which optical wavelengths to evaluate. The base sub-system controller could communication a regime to each UAV via wireless communications. The advantages of this feature includes the ability to have each UAV/detector be instructed to collect reflectance at different wavelengths. Once each communicates the results back to the central processor, they can be evaluated individually or collectively. Another embodiment could have all UAV/detectors collect and evaluate the same wavelength(s). The results of each could be compared. Another embodiment allows the controller to instruct each UAV/detector individually or collectively what wavelengths to look at and/or scan through a set of wavelengths, etc.

D. Options and Alternatives

As will be appreciated by those having skill in this technical art, options and alternatives to the foregoing exemplary embodiments are, of course, possible. Variations obvious to those skill to be included within the invention which is not limited by the embodiments disclosed herein. Some additional examples of options and alternatives are as follows.

1. Form Factor

As indicated above, the form factor of each of the components can vary according to need or desire. The multistatic system 20 basically divides out a Raman standoff optical detection system in such a way that a variety of detector platforms (e.g., one being mobile as with an UAV), including those with substantially small form factors, can carry the detector sub-system and thus have high maneuverability, present more difficulty for adverse parties to detect their presence, and have longer range or hovering times. In some situations, base subsystem 12 and/or at least some detector subsystems 30 can be fixed in place. This still allows acquisition of the same optical information from a target from multiple viewing positions and/or different optical information from multiple viewing positions and/or some combination of the foregoing. As mentioned, the base subsystem could be mobile relative to fixed detector subsystems, or vise versa which, again, allows optical information collection from a target or an area or object of interest in different ways. Both sub-systems could be mobile or at least portable. Size of the overall subsystems, as well as how packaged or housed, can vary according to need or desire, including spatial constraints and our ruggedness requirements.

As discussed above, if any detector subsystem is not mobile, it beneficially could include a way to aim or steer its field of view or collection capability, if needed, to a target to collect relevant optical information. This could include any number of techniques, including gimbal mount and an electromechanical actuator for XYZ pan, tilt, and zoom, or others such as would be known to those skilled in the art. The actuator could be remote controllable or be configured to operate to aim or steer the optical collection components by some geospatial instruction or by locking on to something associated with the target (e.g. a tracking beam or other).

2. Base Platform

The base sub-system platform can be similar to those used in monostatic systems in the state of the art but also can have smaller form factor because of the splitting out of the detector components to the UAVs.

As indicated in FIG. 1A, some type of actuator (automatically, semi-automatically, or even manually controlled) could adjust the aim of the UV laser beam 15 and/or targeting laser beam 17. One example given is a gimbal mount. It could have an electromechanical actuator to change aiming orientation of laser and their beams relative a target. Such electrically or electronically mechanized motion-controlled gimbal devices are known in the art and their calibration and operation via instruction from the base sub-system 12 programmable controller are within the skill of those skilled in this technical art. Alternative components and techniques for motion-control of the aiming of laser beams 15 and/or 17 are, of course, possible and are commercially available. Distance D from base 12 to target 100 can be technically any distance within reasonable operating parameters of system 10 components. But for LED's, it typically is from at least stand-off distances such as are known to those skilled in the art. This could typically be, e.g., from tens of meters to hundreds of meters.

The base sub-system could include much of the processing capability of the overall system (e.g. digital processor, computer, etc.). Some processing can be at each detector-subsystem.

3. Detector Platforms

Carriers for the detector subsystem can take a variety of forms. Aerial drones is one. But other UAVs, including land vehicles, water vehicles (including underwater), or hybrids are of course possible. As mentioned, the detector subsystems can include optical collection component(s). This can be for relevant optical information or content collected from a target. This optical information or content can include for example reflectance, emission, or other optical information or content to the application. As further mentioned, each detector subsystem could be configured to collect the same type of optical information or content from a target and either send it to the base subsystem or do some on-board initial processing. Alternatively, each detector subsystem could be configured to collect different optical information or content and send it on for evaluation. There could be combinations of the same. For example, some detectors could collect the same optical information or content, and some detectors could collect different optical information or content, and then evaluated for a target.

4. Control System

Components necessary to allow inter-communication between electrical/electronic functions of the system can be selected and configured in a variety of ways according to the designer's needs and desires. This could include some type of programmable processor or controller such as are commercially available and configurable by those skilled in the art.

5. Comm System

Likewise, the specific manner of communication of control signals and data signals between components of the system can vary according to need or desire, and the same are available commercially. For example, the base sub-system could communication to the UAVs in a daisy chain manner. Alternatively, there could be direct communication between the base sub-system and each UAV/detector. The designer could select these features.

6. Adjustability

Both factory settings and subsequent adjustments of operation of the system can be easily accomplished by programming and programming of a microprocessor or other intelligent control, including any number of factors, parameters, and the like according to the designer's need or desire. Such programming is well-known.

What is claimed is:

1. A multistatic system for detecting chemical constituents at stand-off distances from a target comprising:
   a. a base sub-system comprising:
      i. a base platform;
      ii. a shared electromagnetic excitation source which is aimable or steerable to a target from a stand-off distance from the target;
      iii. a controller; and
      iv. a base wireless communication interface;
   b. plural detector sub-systems each comprising:
      i. a detector platform;
      ii. an optical content collector;
      iii. an optical content evaluator of optical content from the optical content collector; and
      iv. a detector wireless communication interface;
   c. the controller including programming to:
      i. actuate and direct the shared excitation source to the target;
      ii. control each of the plural detector sub-systems to:
         1. collect optical content from the target after excitation by the shared excitation source; and
         2. process the collected optical content;
      iii. receive via the base wireless communication interface the processed optical content from the plural detector sub-systems; and
      iv. evaluate the received processed optical content from multiple, spatially diverse monostatic optical detectors with a shared excitation source and area of coverage for a chemical constituent of interest.

2. The system of claim 1 wherein the base platform comprises a mobile platform.

3. The system of claim 2 wherein the base sub-system mobile platform comprises a land or water vehicle.

4. The system of claim 1 wherein the detector platform comprises a mobile platform adapted to be remotely controlled to selectable positions relative to the target.

5. The system of claim 4 wherein the mobile detector platform comprises an unmanned vehicle.

6. The system of claim 5 wherein the unmanned vehicle comprises an unmanned aerial vehicle (UAV), unmanned land vehicle, or unmanned water vehicle.

7. The system of claim 1 wherein the excitation source comprises a UV laser and the optical content evaluator comprises at least one of:
   a. a Raman spectrometer to evaluate Raman content in the processed optical content;
   b. a fluorescence detector to evaluate fluorescent content in the processed optical content; and
   c. a reflectance detector to evaluate reflectance content in the processed optical content.

8. The system of claim 1 wherein the base sub-system further comprises an aiming laser operated at a different wavelength than the excitation source for providing target location lock-on function for each detector sub-system with or without a collocating laser.

9. The system of claim 1 wherein the detector sub-system further comprises an adjustable frequency control to allow:
   a. selection of different frequency(ies) of the collected optical content at each mobile subsystem for communication for evaluation at the base sub-system; or
   b. selection of the same frequency(ies) of the collected optical content from plural mobile detection subsystems for communication for evaluation at the base sub-system.

10. The system of claim 1 wherein the chemical constituent of interest comprises an explosive and the target comprises:
   a. an object;
   b. a person;
   c. a person's clothing; or
   d. a vehicle.

11. A method of improved detection of chemicals at standoff distances comprising:
   a. illuminating a target with shared electromagnetic excitation energy of a predetermined wavelength or wavelengths:
   b. collecting optical content from the target after excitation by the shared electromagnetic excitation energy from multiple and different positions relative the target; and
   c. processing the collected optical content at wavelengths correlated for correlations to one or more chemicals of interest;
   d. so that multi-static collection of optical content from multiple, spatially diverse monostatic optical collections based on a shared excitation source and area of coverage relative a target can be used to promote improved detection of the one or more chemicals of interest.

12. The method of claim 11 wherein the excitation energy comprises a UV laser.

13. The method of claim 12 wherein the collecting of optical content comprises using an optical telescope generally aimed at the target.

14. The method of claim 11 wherein the processing comprises:
   a. Raman spectroscopy of the collected optical content;
   b. at:
      i. the same spectral frequencies for each collection position; or
      ii. different spectral frequencies for at least some different collection positions.

15. The method of claim 13 wherein:
   a. the UV laser is portable and moveable relative the target, and
   b. the optical telescopes are portable and moveable relative the UV laser and the target.

16. The method of claim 13 wherein the optical telescope is carried by an individually-controllable UAV.

17. The method of claim 11 further comprising concurrently directing a targeting laser to the target, the targeting laser comprising a different wavelength than the excitation energy, and using a lock-on circuit at each of the multiple and different positions tuned to the targeting laser wavelength.

18. The method of claim 11 wherein the excitation energy, processing of collected optical content, and the multiple and different positions are controlled and correlated by a programmable controller.

19. The method of claim 18 wherein the controlling is via wireless communications.

20. The method of claim 11 applied to explosives detection.

* * * * *